United States Patent

Khudyakov et al.

[11] Patent Number: 5,739,181
[45] Date of Patent: Apr. 14, 1998

[54] RADIATION CURABLE HARDCOAT COMPOSITIONS POSSESSING ANTI-FOG PROPERTIES

[75] Inventors: Igor V. Khudyakov, Clifton Park; George F. Medford, Ballston Lake, both of N.Y.

[73] Assignee: General Electric Company, Waterford, N.Y.

[21] Appl. No.: 660,247

[22] Filed: Jun. 7, 1996

[51] Int. Cl.$^6$ .................... C08K 5/04; C08K 9/06
[52] U.S. Cl. .................... 523/213; 523/425; 524/265; 524/806; 524/860; 524/837; 526/318.2; 526/321; 526/307.5
[58] Field of Search .................... 523/213, 425; 524/806, 860, 837, 265; 526/318.2, 321, 307.5

[56] References Cited

U.S. PATENT DOCUMENTS

| | | | |
|---|---|---|---|
| 3,933,407 | 1/1976 | Tu et al. | 428/447 |
| 4,348,462 | 9/1982 | Chung | 428/412 |
| 4,486,504 | 12/1984 | Chung | 428/412 |
| 4,491,508 | 1/1985 | Olson et al. | 524/806 |
| 5,075,348 | 12/1991 | Revis et al. | 526/318.3 |
| 5,104,732 | 4/1992 | Patel | 428/412 |
| 5,368,941 | 11/1994 | Blizzard et al. | 428/331 |
| 5,466,491 | 11/1995 | Factor et al. | 524/806 |
| 5,468,789 | 11/1995 | Lewis et al. | 524/806 |

FOREIGN PATENT DOCUMENTS

0588508 A1  3/1994  European Pat. Off. .

OTHER PUBLICATIONS

WPI Abstract Accession No. 92–075398/199210 & JP 4018423, Jan. 22, 1992, Japan.

*Primary Examiner*—Vasu Jagannathan
*Assistant Examiner*—Olga Asinovsky
*Attorney, Agent, or Firm*—Kenneth S. Wheelock

[57] ABSTRACT

Transparent substrates are rendered resistant to fogging by the application of a hardcoat composition comprising finely divided silica, a multi-functional olefin containing two or more olefinic moieties and one or more divalent oxyalkylene radicals having the formula:

$$-((CX2)_nO)_x((CX2)O)_y-$$

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon and an olefinically functionalized trialkoxysilane followed by curing.

16 Claims, No Drawings

RADIATION CURABLE HARDCOAT COMPOSITIONS POSSESSING ANTI-FOG PROPERTIES

FIELD OF THE INVENTION

The present invention relates to a hardcoat composition for transparent thermoplastics that is radiation or electron beam curable comprising silicon and a polyacrylate comprising an oxyalkylene moiety whereby the hardcoat exhibits resistance to fogging under exposure to moist air.

BACKGROUND OF THE INVENTION

Transparent thermoplastics have replaced glass in many applications, e.g. transportation glazing, taillight and headlight lenses, corrective optical lenses, architectural glazing and the like. Transparent thermoplastic polymers are lighter and more shatter resistant than glass. Consequently, the use of transparent thermoplastics in transportation glazing leads to a reduction in vehicular weight which leads to an improved fuel economy. Further, the improved shatter resistance of the transparent thermoplastic imparts additional improved safety features when accidents occur that would normally shatter glass glazing or lenses.

However, transparent thermoplastics are not as hard as glass and consequently these materials have a tendency to scratch and mar with even ordinary use due to dust, contact with abrasives, cleaning equipment and weathering. Continuous scratching or marring results in reduced visibility or transparency of the material defeating its initial purpose. This leads to the need to replace the material. In fact, one widely used transparent thermoplastic, polycarbonate, is so soft in an untreated or uncoated state that soft paper tissues can scratch the surface. Since this material has received widespread application as a replacement material for eyeglass lenses, this can be a significant drawback.

There thus has developed a significant body of technology dealing with means of coating transparent thermoplastics, thereby producing transparent laminates, to improve their performance characteristics to be more similar to that of glass while at the same time retaining the weight advantages that the less dense thermoplastics intrinsically possess. U.S. Pat. No. 4,348,462 discloses a radiation curable hardcoat composition for such transparent thermoplastics that comprises colloidal silica, an acryloxysilane, and a non-silyl acrylate. This composition, as a coating, imparts improved abrasion resistance to transparent thermoplastics relative to the same thermoplastics that are not so coated, thus the term hardcoat. These generic formulations have been continuously improved but even recent U.S. patents still recite colloidal silica, an alkoxy silylacrylate (cf. acryloxysilane), and a reactive acrylic monomer (U.S. Pat. No. 5,468,789). Alternative formulations recite colloidal silica and a multi-functional acrylate (U.S. Pat. No. 5,075,348), which is primarily a diacrylate species.

While these compositions impart a certain hardness to the coating by virtue of the presence of the colloidal silica, which on a micro-scale could be assumed to mimic glass, the matrix binding the colloidal silica within the coating and also binding the coating to the transparent thermoplastic substrate is an organic polymer having a tendency to be hydrophobic.

As a hydrophobic coating, colloidal silica dispersed in a polymerized organic matrix such as an acrylate does not function well in moist environments. When exposed to water, either as rain, fog, mist or a humid atmosphere, condensation occurs on the surface of the transparent thermoplastic and the water tends to bead up. The phase boundary of the water beads on the surface of the transparent thermoplastic serves to reflect and refract light, which is undesirable. Further, water is transparent and has a different index of refraction from the transparent thermoplastic substrate, the beads of water on the surface display a lensing effect interfering with visibility. Thus, a hydrophilic coating having anti-fog, that is anti-beading properties for water, would have better optical properties when challenged by water. This is because as the hydrophilicity of the surface coating increased, condensed water on the surface would have an increasing tendency to form a sheet instead of a multiplicity of water droplets that interfered with visibility or transmission of light.

While anti-fog coatings are known, and have been used with some transparent thermoplastics, they have not been particularly abrasion resistant (U.S. Pat. No. 3,933,407). The anti-fog coatings disclosed in U.S. Pat. No. 3,933,407 were applied to flexible polyethylene films as well as to rigid articles manufactured from glass and transparent thermoplastics. However, these coatings were not particularly abrasion resistant, i.e. they contained no colloidal silica.

SUMMARY OF THE INVENTION

We now disclose radiation curable hardcoat compositions that have improved resistance to fogging.

The present invention provides for an ultraviolet curable hardcoat composition comprising:

(A) finely divided silica:

(B) a multi-functional olefin containing two or more olefinic moieties and one or more divalent oxyalkylene radicals having the formula:

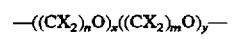

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals; and (C) an olefinically functionalized trialkoxy silane.

The present invention also provides a method for making an ultraviolet curable hardcoat composition comprising:

(a) reacting
  (i) an olefinically functionalized trialkoxy silane with
  (ii) a finely divided silica in the presence of
  (iii) a hydroxylic solvent to produce a reaction product and (b) mixing the reaction product with a multi-functional olefin containing two or more olefinic moieties and one or more divalent oxyalkylene radicals having the formula:

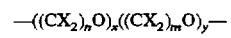

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals.

The present invention further provides a method for making a laminate comprising:

(a) reacting
  (i) an olefinically functionalized trialkoxy silane with
  (ii) a finely divided silica in the presence of
  (iii) a hydroxylic solvent to produce a reaction product and
(b) mixing the reaction product with a multi-functional olefin containing two or more olefinic moieties and one or more divalent oxyalkylene radicals having the formula:

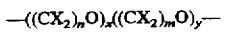

$$-((CX_2)_nO)_x((CX_2)_mO)_y-$$

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals thereby preparing an ultraviolet curable hardcoat composition; and (c) applying the ultraviolet curable hardcoat composition to a transparent substrate.

In addition the present invention provides a method for rendering a transparent substrate resistant to fogging comprising:

(a) reacting
  (i) an olefinically functionalized trialkoxy silane with
  (ii) a finely divided silica in the presence of
  (iii) a hydroxylic solvent to produce a reaction product and
(b) mixing the reaction product with a multi-functional olefin containing two or more olefinic moieties and one or more divalent oxyalkylene radicals having the formula:

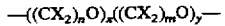

$$-((CX_2)_nO)_x((CX_2)_mO)_y-$$

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals thereby preparing an ultraviolet curable hardcoat composition;

(c) applying the ultraviolet curable hardcoat composition to a transparent substrate; and (d) curing the ultraviolet curable hardcoat composition.

DETAILED DESCRIPTION OF THE INVENTION

The hardcoat composition of the present invention is a radiation or electron beam curable composition that may be coated onto a substrate to impart both abrasion resistance and anti-fogging properties to the material coated (the phrase ultraviolet curable in the appended claims includes curing processes that occur by means of free radical processes). The primary use envisioned for the coating composition of the present invention is to coat transparent thermoplastics that are normally soft and easily scratched by comparison to glass. While coating glass with the composition of the present invention might not particularly improve the abrasion resistance of the glass, it is conceivable that the coating could improve the anti-fogging characteristics of the glass so coated, a benefit to automotive glazing and architectural glazing applications. Thus the term transparent substrate in the appended claims includes glass. The term transparent thermoplastic includes but is not limited to polycarbonates, polyacrylates, polymethylmethacrylates, polystyrenes, polyolefins such as polyethylene, polypropylene, syndiotactic crystalline polypropylene, polyesters such as polyethylene terephthalate and polybutylene terephthalate, styrene acrylonitrile copolymers, polyamides such as nylon, polyimides and the various copolymers of these materials. For purposes of definition, any transparent polymeric material that is thermoplastic and possesses an ASTM D871 haze below about 200 (or an equivalent ASTM measurement since D871 is actually used to measure the turbidity of solutions) through an optical path of 5 mm is defined as a transparent thermoplastic.

The anti-fogging hardcoat compositions of the present invention comprise:

(A) from about 0.3 weight percent to about 35.0 weight percent, preferably from about 1.5 weight percent to about 24.0 weight percent, more preferably from about 4.5 weight percent to about 18.0 weight percent and most preferably from about 8.0 weight percent to about 15.0 weight percent of finely divided or colloidal silica, having an average particle size ranging from about 5 to about 40 nanometers, preferably from about 10 to about 30, more preferably from about 15 to about 25, and most preferably from about 16 to about 22 nanometers in diameter. When supplied as colloidal silica, the finely divided silica will be supplied as a colloidal dispersion in a solvent, typically water, or a mixture of water and a water miscible alcohol. Since the compositions of the present invention are made and used as coatings, a liquid vehicle is typically necessary to render the composition coatable. Due to the nature of the other components, water or a mixture of water and water miscible solvents is generally used, a particularly preferred class of water miscible solvents is alcohols.

(B) from about 20.0 weight percent to about 97.0 weight percent, preferably from about 40.0 weight percent to about 95.0 weight percent, more preferably from about 50.0 weight percent to about 92.0 weight percent and most preferably from about 60.0 weight percent to about 90.0 weight percent a di- or multi-functional alkenyl compound wherein the alkenyl functionalities of the molecule are separated by or alternatively joined by at least one divalent polyoxyalkylene moiety having the formula:

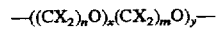

$$-((CX_2)_nO)_x(CX_2)_mO)_y-$$

where the sum of x+y is ten or greater, n≠m, and n and m have values ranging from one to ten, preferably from one to eight, more preferably from one to seven, and most preferably from one to five where each X is independently selected from the group consisting of hydrogen, one to forty carbon atom monovalent hydrocarbon radicals and six to forty carbon atom monovalent aromatic hydrocarbon radicals, the alkenyl functionalities being joined to the divalent oxyalkylene moiety by a monovalent, divalent, or multivalent alkylene moiety whereby the alkenyl compound is rendered di-, tri-, or multi-functional in terms of olefinic unsaturation. Preferably X is hydrogen, a one to ten carbon atom monovalent hydrocarbon radical or a six to ten carbon atom monovalent aromatic radical, more preferably X is hydrogen or methyl, and most preferably X is hydrogen. The term hydrocarbon radical is defined to include, but is not limited to, for example alkyl, alkenyl, alkynyl, hydroxy-alkyl, halo-alkyl, amino-alkyl, thio-alkyl, aryl, phenyl, benzyl, pyridinyl, thiophenyl, furanyl, naphthyl, anthracenyl and other condensed ring aromatics and condensed ring heterocycles where the hetero atom may be oxygen, nitrogen, sulfur or phosphorus.

The monovalent alkylene moiety is defined as a radical having the formula:

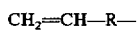

where R is any divalent atom or radical; the divalent alkylene moiety has the formula:

where $R^1$ is any trivalent atom or radical; the trivalent alkylene radical has the formula:

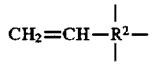

where $R^2$ is any tetravalent atom or radical. By appropriate use of the di- and trivalent alkylene radicals a multi-functional alkylene compound may be assembled. For purposes of definition, particular examples of divalent atoms are O, S, Se and non-metals having a (−2) oxidation state as well as those metals and non-metals having a (+2) oxidation state. Similarly, for purposes of definition, particular examples of trivalent atoms are N, P, As, Sb and non-metals having a (−3) oxidation state as well as those metals and non-metals having a (+3) oxidation state. Finally, for purposes of definition, particular examples of quadrivalent atoms are C, Si, Ge, Sn and non-metals having a (−4) oxidation state as well as those metals having a (+4) oxidation state.

Divalent radicals are defined as any collection of two or more atoms satisfying the rules of chemical combination but having two unsatisfied points of chemical bonding so that they may be incorporated into the structure thereby satisfying the rules of chemical bonding. Examples of divalent species subtended by this description are: —(CH$_2$)$_p$— where p may range from 1 to numbers as large as 40, —CH=CH—, H$_2$C=C<, —C≡C—, —CO$_2$—, —C$_6$H$_4$— (divalent phenyl), —C$_6$H$_{10}$— (divalent cyclohexyl), and the like. It should be noted that two or more divalent radicals or atoms may joined one to the other thereby creating another divalent radical which will function in like manner in terms of chemical structure and bonding.

Trivalent radicals are defined as any collection of two or more atoms satisfying the rules of chemical combination but having three unsatisfied points of chemical bonding so that they may be incorporated into the structure thereby satisfying the rules of chemical bonding. Examples of trivalent species subtended by this description are:

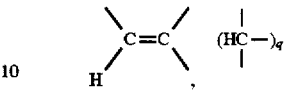

where q may range from 1 to numbers as large as 40, —C$_6$H$_3$= (trivalent phenyl), —C$_6$H$_9$= (trivalent cyclohexyl), and the like. It should be noted that divalent atoms or radicals may be combined with a trivalent atom or radical to create additional trivalent radicals. The combination of two or more trivalent atoms or radicals with one or more divalent atom or radical creates a multivalent radical.

The structural combinations and permutations subtended by this description are fairly large. In order for the compositions of the present invention to function as an ultraviolet or electron beam curable compositions that impart anti-fogging properties to a hardcoat, the di- or multi-functional alkenyl compound must possess at least one divalent polyoxyalkylene moiety having the formula:

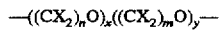

where the sum of x+y is ten or greater, n≠m, and n and m have values ranging from one to ten, preferably from one to eight, more preferably from one to seven, and most preferably from one to five where each X is independently selected from the group consisting of hydrogen, one to forty carbon atom monovalent hydrocarbon radicals and six to forty carbon atom monovalent aromatic hydrocarbon radicals and two or more olefinic moieties having a structural formula:

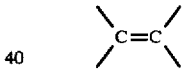

where the unsatisfied points of chemical bonding are satisfied by divalent, trivalent or quadrivalent atoms or radicals or terminated by monovalent atoms or radicals, the monovalent atoms being selected from the group consisting of hydrogen, the halogens fluorine, chlorine, bromine, and iodine, monovalent hydrocarbon radicals having from one to forty carbon atoms and monovalent aromatic hydrocarbon radicals having from six to forty carbon atoms. The multifunctional olefin must contain at least two olefinic moieties and at least one oxyalkylene divalent radical chemically linked by some combination of divalent, trivalent, and quadrivalent atoms or radicals with termination of unsatisfied points of chemical bonding by monovalent atoms or radicals. When the di- or multi-functional alkenyl compound possesses more than one polyoxyalkylene moiety, e.g. —((CX2)$_n$O)$_{x(i)}$((CX2)$_m$O)$_{y(j)}$—, —((CX2)$_n$O)$_{x(ii)}$((CX2)$_m$O)$_{y(jj)}$—, ((CX2)$_n$O)$_{x(iii)}$((CX2)$_m$O)$_{y(jjj)}$—, . . . , the sum of the stoichiometric subscripts x (x(i)+x(ii)+x(iii)+ . . . ) and y (y(j)+y(jj)+y(jjj)+ . . . ) must be ten or greater. Thus chain length of the polyoxyalkylene bridge in the di- or multi-functional alkenyl compound may be shortened if the number of divalent polyoxyalkylene bridging groups present in the molecule is increased, with X as previously defined.

Another formula for the di- or multi-functional alkenyl compound is thus:

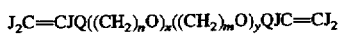

where Q is independently selected from the group of divalent, trivalent and tetravalent atoms and radicals subject to the limitation that if trivalent or tetravalent atoms or radicals are selected the unsatisfied points of chemical bonding are satisfied by a monovalent atom or radical, and J is selected from the group of monovalent, divalent, trivalent and quadrivalent atoms or radicals subject to the limitation that if divalent, trivalent or tetravalent atoms or radicals are selected the unsatisfied points of chemical bonding are satisfied by a monovalent atom or radical. The purpose of the foregoing is to demonstrate the multiplicity of structures that will satisfy the minimum requirements that the compound be di- or multi-functional in respect to the number of points of olefinic unsaturation possessing at least one long oxyalkylene chain as defined by the subscripts n and m. While it may not be possible to write a perfectly generalizable formula for a di-olefin that contains at least one oxyalkylene moiety the previous exposition is by way of explaining the structural variations that are possible to meet this minimum requirement. Consequently while the appended claims may recite simpler species that satisfy this minimum requirement, all compounds that satisfy this minimum requirement by virtue of such structural variations and permutations are included. Applicants note that two embodiments satisfying the requirements for component (B) of the compositions of the present invention are available commercially, SR610 and SR295, from Sartomer of Extort, Pa. Other embodiments satisfying the structural requirements of component (B) may be conveniently synthesized using the techniques of organic synthesis known in the art and science of organic chemistry.

One particularly useful sub-class of this large class of materials is:

in particular where n=2, m=0, x=13, y=0; where the di-olefin is a diacrylate. In this particular example, the alkylene moiety is H₂C=CH—, J is hydrogen, and Q is a divalent radical, R, which has no branching points for further substituents,

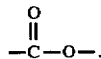

The example thus minimally satisfies the requirement that the di- or multi-functional olefin (used interchangeably with di- or multi-functional alkylene compound) should have at least one oxyalkylene (used interchangeably with polyoxyalkylene) divalent radical.

(C) from about 0.1 weight percent to about 40.0 weight percent, preferably from about 0.5 weight percent to about 30.0 weight percent, more preferably from about 1.0 weight percent to about 20.0 weight percent and most preferably from about 2.0 weight percent to about 10.0 weight percent of an olefinically functionalized trialkoxy silane having the general formula:

$R_4Si(OR^3)_3$, where $R^4$ is a monovalent alkylene radical having from two to forty carbon atoms and $R^3$ is selected from the group of one to forty carbon atom monovalent alkyl hydrocarbon radicals and six to forty carbon atom monovalent aromatic hydrocarbon radicals. A more specific formula for the olefinically functionalized trialkoxy silane is as follows:

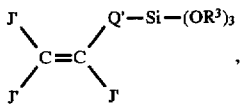

where J' is selected from the group of previously defined monovalent, divalent, trivalent and quadrivalent atoms or radicals subject to the limitation that if divalent, trivalent or tetravalent atoms or radicals (or some combination thereof) are selected the unsatisfied points of chemical bonding are satisfied by a monovalent atom or radical; Q' is selected from the group of previously defined divalent, trivalent and tetravalent atoms and radicals subject to the limitation that if trivalent or tetravalent atoms or radicals are selected the unsatisfied points of chemical bonding are satisfied by a monovalent atom or radical and $R^3$ is selected from the group of one to forty carbon atom monovalent alkyl hydrocarbon radicals and six to forty carbon atom monovalent aromatic hydrocarbon radicals.

A particularly preferred example of component (C) is the following:

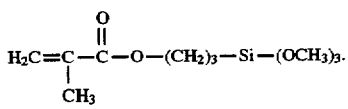

Molecules having the general formula, R'Si(OR")₃ (cf. $R^4Si(OR^3)_3$), are monomeric precursors to T resins because they are susceptible to reaction with hydroxylic solvents. By hydroxylic solvent is meant water, alcohols, Bronsted acids or mixtures of these and the like which will initiate solvolysis. The solvolysis of T resin precursors in hydroxylic solvents leads to a reaction known as polycondensation resulting in the T resin. Depending on the extent of the reactions, the product may or may not be fully hydrolyzed and condensed. As generally used in the field of ultraviolet curable coatings, such reactive T resin precursors when dissolved in a hydroxylic solvent such as water may be referred to as hydrolyzates, i.e. the hydrolysis and polycondensation product of a T resin precursor dissolved in water or other hydroxylic solvent. As used in the experimental section of the instant application, hydrolyzate refers to the complex reaction mixture resulting when a T resin precursor is mixed with aqueous colloidal silica. It is to be noted that such a complex mixture may contain other additional polymerizable species that have been subsequently added, e.g., diacrylates such as hexanediol diacrylate.

Similar reactions occur in alcoholic solution (and other protic solvents), although probably not at the same kinetic rate due to the much lower reactivities of alcohols by comparison to that of water. Assuming a complete hydrolysis and polycondensation reaction, 100 parts by weight of methacryloxypropyltrimethoxy silane yields approximately 72 parts by weight of methacryloxy propyl silsesquioxane as the fully hydrolyzed and condensed reaction product of the methacryloxy propyl trimethoxy silane.

It is to be noted that the colloidal silica, component (A), is usually furnished to the compositions of the present invention as an aqueous dispersion, which satisfies the requirement that a hydroxylic solvent be present. Component (C), an olefinically functionalized trialkoxy silane, as previously noted, is water reactive. Mixture of component (A), as an aqueous or alcoholic dispersion, with component (C) will functionalize the finely divided (or colloidal) silica of component (A) and produce a hydrolyzate that is the polycondensation product of component (C) that is in intimate mixture with the finely divided silica by reason of the water (hydroxylic solvent) reactivity of component (C). In the case where the silica is furnished in an alcoholic dispersion, a small amount of water must be added to hydrolyze the alkoxy groups (or halide groups) present in the alkenyl hydrolyzable silane, component (C). Thus the recitation of a composition comprising curable or reactive species, e.g., components (A), (B), and (C) or components (A) and (C); in the appended claims also includes the reaction products thereof and mixtures of those reaction products. Applicants note that (B) and (C) can also be co-reactive if either one of the these two components are present in solution in a hydroxylic solvent and mixed together.

The compositions of the present invention may optionally include other polymerizable species as well. Such species may be mono-functional olefins, e.g., acrylic acid or esters thereof, or acetylenes, e.g., mono-butynylmaleate or fumarate. They may also be di- or multi-functional such as the diacrylates. A particularly preferred diacrylate is hexanediol diacrylate as an additional polymerizable component. When such additional polymerizable components are used they are added to the base composition containing components (A), (B), and (C) are used at a level of from about 2.9 weight percent to about 23.1 weight percent, preferably from about 4.7 weight percent to about 16.6 weight percent, and more preferably from about 7.4 weight percent to about 12.2 weight percent. These ranges may be expressed as parts by weight per hundred parts by weight (pph) of the sum of (A), (B) and (C); thus 2.9 weight percent is approximately 3 pph, 23.1 weight percent is approximately 30 pph, 4.7 weight percent is approximately 5 pph, 16.6 weight percent is approximately 20 pph, 7.4 weight percent is approximately 8 pph and 12.2 weight percent is approximately 14 pph.

Since the compositions of the present invention involve reactive mixtures of polymerizable species it is frequently desirable to include olefin polymerization inhibitors at a weight level (on the total composition) of from about 0.0001 weight percent to about 1.50 weight percent, preferably from about 0.001 weight percent to about 1.00 weight percent, more preferably from about 0.005 weight percent to about 0.50 weight percent and most preferably from about 0.01 weight percent to about 0.25 weight percent.

These olefin polymerization inhibitors may be selected from the group consisting of 2,6-di-tert-butyl-4-methylphenol, 2-tert-butyl-4-methoxyphenol, 3-tert-butyl-4-methoxyphenol, alkyl substituted phenol where the alkyl group has from 1 to 30 carbon atoms, di-alkyl substituted phenol where each alkyl group independently has from one to 30 carbon atoms, tri-alkyl substituted phenol where each alkyl group independently has from one to 30 carbon atoms, styrylphenol, di-styrylphenol, tri-styrylphenol, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-ethylidenebis(4,6-di-tert-butylphenol), 2,2'-methylenebis(4-methyl-6-(1-methylcyclohexyl)-phenol), 4,4'-butylidenebis(6-tert-butyl-3-methylphenol), 4,4'-thiobis(6-tert-butyl-3-methylphenol), 4,4'-methylenebis(2,6-dimethylphenol), 1,1'-thiobis(2-naphthol), 2,2'-thiobis(4-methyl-6-tert-butylphenol), 2,2'-isobutylidenebis(4,6-dimethylphenol), tetrakis(methylene 3-(3,5-di-tert-butyl-4-hydroxyphenyl)propionate)methane, 1,3,5-trimethyl-2,4,6-tris(3,5-di-tert-butyl-4-hydroxybenzyl)-benzene, 1,3,5,-tris(3,5-di-tert-butyl-4-hydroxybenzyl)-s-triazine-2,4,6(1H,3H,5H)trione, 2,4-bis(n-octylthio)-6-(4-hydroxy-3,5-di-tert-butylamino) 1,3,5-triazine, 4-(hydroxymethyl)-2,6,-di-tert-butylphenol, 2,2-diphenyl-1-picrylhydrazyl, dilauryl thiodipropionate, distearyl thiodipropionate, O,O-di-normal-octadecyl(3,5-di-tert-butyl-4-hydroxybenzyl)-phosphonate, 1,6-hexamethylene bis(3,5-di-tert-butyl-4-hydroxyphenyl) propionate, thiodiethylene bis(3,5-di-tert-butyl-4-hydroxyphenyl)propionate, octadecyl 3-(3,5-di-tert-butyl-4-hydroxyphenyl)propionate, N,N'-hexamethylene bis(3-(3,5-di-tert-butyl-4-hydroxyphenyl)-propionamide, 1,3,5-tris(2-hydroxyethyl)-s-triazine-2,4,6-(1H,3H,5H) trione, N-(4-hydroxyphenyl)butyramide, N-(4-hydroxyphenyl) pelargonamide, N-(4-hydroxyphenyl)dodecanamide, N-(4-hydroxyphenyl)stearamide, 2,6-di-tert-butyl-4-(dimethylaminoethyl)phenol, 1,3,5-tris(4-tert-butyl-3-hydroxy-2,6-dimethylbenzyl-s-triazine-2,4,6-(1H,3H,5H) trione, nickel bis(O-ethyl(3,5-di-tert-butyl-4-hydroxybenzyl)phosphonate), 2,2'-oxamidobisethyl 3-(3,5-di-tert-butyl-4-hydroxyphenyl)propionate, tris(2-tert-butyl-4-(2-methyl-4-hydroxy-5-tert-butylphenylthio)-5-methyl) phenylphosphite, tetrakis (2,4-di-tert-butylphenyl) 4,4'-diphenylylenediphosphonite, normal-propyl 3,4,5-trihydroxybenzoate, calcium bis(O-ethyl(3,5-di-tert-butyl-4-hydroxybenzyl)phosphonate, Banfield's radical, 1,3,5-triphenyl verdazyl, Koelsch's radical, 1-nitroso-2-naphthol, 4-hydroxy-2,2,6,6-tetramethyl-1-piperidin-1-oxyl, galvinoxyl, 2,5-di-tetramylhydroquinone, tert-butylhydroquinone, and methylhydroquinone.

The following compounds have been referred to in this specification and under the condition that the name referred to in the specification is not sufficiently specific are hereby defined by Applicants by their chemical structures as follows:

Galvinoxyl:

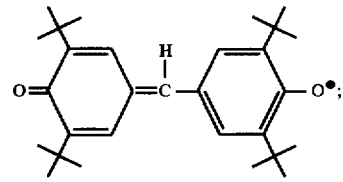

4-OH-TEMPO(4-hydroxy-2,2,6,6-tetramethyl-1-piperidin-1-oxyl);

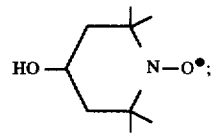

Tinuvin ®:

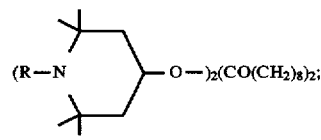

where R is hydrogen for Tinuvin 770®, and for other inhibitors carrying the same tradename but different identifying numbers, R may be selected from the group consisting of hydrogen, monovalent hydrocarbon radicals of from one to about thirty carbon atoms and monovalent alkoxyl groups where the alkyl of the alkoxyl is a monovalent hydrocarbon radical of from one to about thirty carbon atoms;

1,3,5-triphenyl verdazyl:

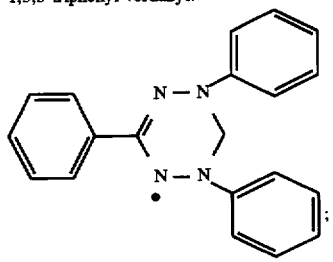

Koelsch's radical:

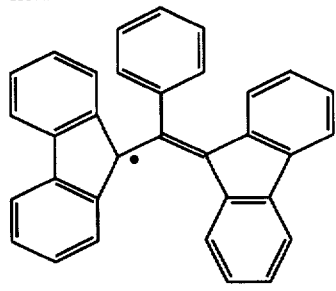

Banfield's radical:

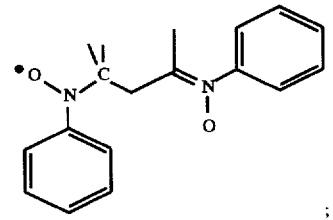

1-nitroso-2-naphthol:

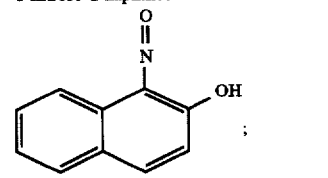

2,2-diphenyl-1-picrylhydrazyl(DPPH):

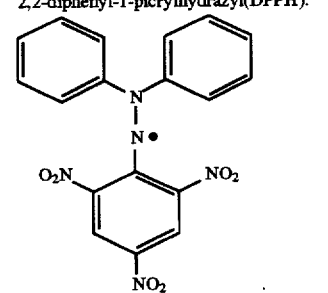

The compositions of the present invention are ultraviolet or electron beam curable. Frequently it is desirable to include in the composition a photo-initiator to accelerate the speed of the ultraviolet cure. Several compounds are commercially available for this purpose, e.g. 2-hydroxy-2-methyl-1-phenylpropan-1-one, available commercially as Darocur™ 1173 from Radcure of Smyrna, Ga.

The incorporation of colloidal silica into an ultraviolet or electron beam curable coating composition that contains a di- or multi-functional alkenyl compound that contains at least one oxyalkylene moiety renders the composition both anti-fogging and abrasion resistant.

Coating thickness of the compositions of the present invention may be controlled by diluting the composition with water or with suitable water miscible alcohols or mixtures thereof. It is also possible to use other water miscible organic compounds, e.g. acetone. Water miscible alcohols are usually low molecular weight alcohols and are particularly useful for diluting these compositions, particularly alcohols having from one to ten carbon atoms, preferably from two to eight carbon atoms, more preferably from three to eight carbon atoms and most preferably from three to six carbon atoms. The alcohols may be mono-functional, di-functional as in ethylene glycol, or multi-functional.

The appended examples are include by reference to demonstrate the practice of the present invention and are not intended by way of demonstration to construe any limitation on the appended claims.

All U.S. patents referenced herein, are herewith and hereby incorporated by reference.

EXPERIMENTAL

Fogging Test

The fogging test referred to in the following examples is conducted as follows. A beaker is filled to within one inch of the top with water and maintained at a temperature of 50° C. Treated panels of transparent substrate are placed, treated face down on the beaker, and the time until the appearance of condensate (fog) on the treated surface d the panel (nearest the heated water) is measured. This time measurement usually ranges from less than one second to several seconds. Generally, the fogging times as measured by this test are accurate to ±1 second. A coating (or hardcoating) that has a fogging time of 10±1 seconds or greater is defined as anti-fogging.

Taber Haze (ASTM D-1044)

The ASTM test protocol leaves the auxiliary weight and the abrading wheel unspecified. These tests were conducted with that weight being 500 g per wheel using CS-10F wheels.

EXAMPLE 1

A coating composition was prepared from the following ingredients:

1) 100 g of aqueous colloidal silica, having an average particle size of 20±4 nanometers and 34 weight percent silica (component (A), Nalcoag 1034A™);

2) 100 g of $CH_2=CHC(O)O-(CH_2CH_2O)_x-OC(O)CH=CH_2$, where x averages approximately 13, available commercially as SR610™ from Sartomer d Exton, Pa. (component (B)); and 3) 12 g of 2-hydroxy-2-methyl-1-phenylpropan-1-one, available commercially as Darocur™ 1173 from Radcure of Smyrna, Ga. The resulting mixture was diluted with 160 g iso-propyl alcohol and thoroughly mixed by shaking. The mixture had a viscosity of 9 centipoise at 25° C.

Polyethylene terephthalate (PET) film was flow coated with this mixture and allowed to air dry for approximately 30 minutes. The flow coated film was subjected to ultraviolet radiation to initiate curing by two passes through a Fusion System processor two inches from the 300 W/in² Fusion-H lamps, at a processing speed of 30 fpm.

The coating had a thickness of 9 microns and a fogging time of 20 seconds. The change in Taber haze (ASTM D-1044) of the coating after 100 cycles was 26%, in comparison to the uncoated PET film which experienced a change of 49% in Taber haze.

EXAMPLE 2

The mixture of example 1 was diluted with iso-propyl alcohol on a weight basis of 2.8 parts alcohol to 1 part mixture. This coating composition was applied to PET film as in the previous example and after a flash time of 20 seconds was cured in one pass at a processing speed of 50 fpm. The resulting coating was 5 microns thick and had a fogging test time in excess of 10 seconds (a pass) with a delta Taber haze of 32%.

EXAMPLE 3

In an Erlenmyer flask equipped with a magnetic stirring bar was added 121.7 g of iso-propyl alcohol, 86.9 g, Nalcoag 1034A™, aqueous colloidal silica (34 weight percent silica) and 0.07 g 4-OH TEMPO. To this mixture was added 13.0 g methacryloxypropyltrimethoxy silane. The mixture was heated to reflux, approximately 80° C., for two hours and was then cooled to room temperature. 36.2 g of hexanediol diacrylate and 325 g iso-propyl alcohol was then added. This mixture was then vacuum stripped at 10–20 torr on a rotary evaporator until no more overhead was collected. Seventy-five grams of material was recovered that had a composition as follows: silica (29.5 g), hexanediol diacrylate (36.2 g), and 9.4 g methacyloxypropyl silsesquioxane (acrylate functional T resin).

To 33 g of the mixture containing silica, hexanediol diacrylate and acrylate functional T resin was added 67 g of

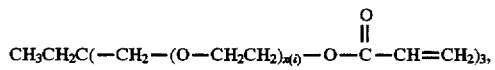

available as SR9035™ from Sartomer of Exton, Pa., where each x(i) averages 5 and the sum of x(1)+x(2)+x(3) averages 15, satisfying the minimum requirement that the sum of x and y be at least ten, and 6 g of 2-hydroxy-2-methyl-1-phenylpropan-1-one, available commercially as Darocur™ 1173 from Radcure of Smyrna, Ga. The mixture was flow coated onto polyethylene terephthalate film. After 5 minutes of drying in air the coated film was subjected to curing by exposure to ultraviolet radiation by two passes through a Fusion System processor two inches from the 300 Watts per square inch (W/in$^2$) Fusion-H lamps, at a processing speed of 30 feet per minute (fpm). The cured coating was 20 microns thick and had a fogging time of 15 seconds with a delta Taber haze of 10%.

While the oxyalkylene bridge groups in this particular diacrylate are not 10 repeat units long, x=5, there are fifteen of them present in the molecule, meeting the minimum requirement of at least ten. Thus, this example shows that as long as there are the requisite number of repeating ether groups, it is not required that they form one continuous chain of polyether groups. Thus more than one oxyalkylene moiety is allowable even if the stoichiometric subscript is less than ten as long as the sum of the stoichiometric subscripts is ten or greater.

EXAMPLE 4

A coating composition was prepared from the following ingredients:

1) 100 g of aqueous colloidal silica, having an average particle size of 20±4 nanometers and 34 weight percent silica (component (A), Nalcoag 1034A™);

2) 100 g of $CH_2=CHC(O)O-(CH_2CH_2O)_x-OC(O)CH=CH_2$, where x averages approximately 13, available commercially as SR610™ from Sartomer of Exton, Pa. (component (B)); and 3) 12 g of 2-hydroxy-2-methyl-1-phenylpropan-1-one, available commercially as Darocur™ 1173 from Radcure of Smyrna, Ga. The resulting mixture was diluted with 50 g iso-propyl alcohol and coated onto a polycarbonate panel. After drying for 5 minutes in air, the coated panel was subjected to ultraviolet radiation to cure the coating as described in example 1. The cured coating had a thickness of 20 microns, a fogging time of 25 seconds, and a delta Taber haze of 20%. By comparison, the Taber delta haze of the uncoated polycarbonate was 40%.

EXAMPLE 5

A coating composition was prepared from the following ingredients:

1) 20 g of aqueous colloidal silica, having an average particle size of 20±4 nanometers and 34 weight percent silica (component (A), Noalcoag 1034A™);

2) 20 g of $CH_2=CHC(O)O-(CH_2)_6-OC(O)CH=CH_2$, hexanediol diacrylate (HDDA); and 3) 2.4 g of 2-hydroxy-2-methyl-1-phenylpropan-1-one, available commercially as Darocur™ 1173 from Radcure of Smyrna, Ga. The resulting mixture was diluted with 200 g iso-propyl alcohol and coated onto polycarbonate (PC) panels and polyethylene terephthalate (PET) film. After ultraviolet curing, both the coated PC and the coated PET fogged immediately when subjected to the fogging test. By reference to example 1 and example 4, the presence of a di- or multi-functional alkylene compound possessing at least one polyoxyalkylene divalent radical, e.g. $CH_2=CHC(O)O-(CH_2CH_2O)_x-OC(O)CH=CH_2$ (where x is on average approximately 13), renders the coating composition anti-fogging.

EXAMPLE 6

Several small batches were prepared where methacryloxypropyl trimethoxy silane was reacted with aqueous colloidal silica as follows to produce a mixture of the reaction product or hydrolyzate (acrylate functional T resin), hexanediol diacrylate and silica.

In an Erlenmyer flask equipped with a magnetic stirring bar was added 121.7 g of iso-propyl alcohol, 86.9 g, Nalcoag 1034A™, aqueous colloidal silica (34 weight percent silica) and 0.07 g 4-OH TEMPO. To this mixture was added 13.0 g methacryloxypropyltrimethoxy silane. The mixture was heated to reflux, approximately 80° C., for two hours and was then cooled to room temperature. 36.2 g of hexanediol diacrylate and 325 g iso-propyl alcohol was then added. This mixture was then vacuum stripped at 10–20 torr on a rotary evaporator until no more overhead was collected. Seventy-five grams of material was recovered that had a composition as follows: silica (29.5 g), hexanediol diacrylate (36.2 g), and 9.4 g methacyloxypropyl silsesquioxane. This composition is reported in Table 1 broken down by its constituents, silica, 1.6 hexanediol diacrylate, and acrylate functional T resin (in this case methacryloxypropyl silsesquioxane; it is to be noted that methacryloxypropyl silsesquioxane is the hydrolysis and polycondensation product of methacryloxypropyl tri-methoxy silane).

TABLE 1

Anti-Fog Coating Compositions Containing Acrylate Polyethers, Finely Divided Silica, and an Acrylate Functional T Resin

| Formulation | Silica[1], wt. % | 1,6-Hexanediol diacrylate (HDDA), wt. % | SR610[2] or SR295[3] wt. % | Acrylate Functional T Resin[4] wt. % |
|---|---|---|---|---|
| A | 31 | 37 | 23[3] | 9 |
| B | 27 | 32 | 33[2] | 8 |
| C | 20 | 24 | 50[2] | 6 |
| D | 16 | 19 | 60[3] | 5 |
| E | 13 | 16 | 67[2] | 4 |
| F | 10 | 12 | 75[2] | 3 |
| G | 8 | 10 | 80[2] | 2 |
| H | 7 | 8 | 83[2] | 2 |

Notes to Table 1:
[1] Weight percent silica is from an aqueous dispersion of colloidal silica, Nalcoag 1034A ™, which is 34 weight percent silica.
[2] SR610 ™ is $CH_2=CHC(O)O-(CH_2CH_2O)_x-OC(O)CH=CH_2$, where x averages approximately 13.
[3] SR295 ™ is pentaerythritoltetraacrylate.
[4] Defined as the reaction product of methacryloxy propyl trimethoxy silane and water in the presence of an effective amount of a hydrolysis and condensation catalyst.

To 100 parts by weight of each of the compositions listed in Table 1 were added 6 parts by weight of 2-hydroxy-2-methyl-1-phenylpropan-1-one, available commercially as Darocur™ 1173 from Radcure of Smyrna, Ga. and an additional 200 parts by weight of iso-propyl alcohol. Polycarbonate panels were flow coated and allowed to air dry for 2–5 minutes prior to curing with ultraviolet radiation, one pass under two 300 W/in² Fusion H lamps at a speed of 20 fpm.

TABLE 2

Performance Properties of Anti-Fog Coating Compositions Containing Acrylate Polyethers, Finely Divided Silica, and an Acrylate Functional T Resin

| Formulation | Fogging Time, seconds | Delta Taber Haze (100 cycles), % change |
|---|---|---|
| A | 2 | n/a |
| B | 3 | 6 |
| C | 5 | 8 |
| D | 2 | n/a |
| E | 9 | 15 |
| F | 13 | 15 |
| G | 14 | 22 |
| H | 15 | 29 |
| uncoated polycarbonate | 1 | 38 |

These results show marked improvement by most of the formulations in fogging time. Additionally, some of these compositions also show improved abrasion resistance, lower delta Taber haze (% change). These results demonstrate that good abrasion resistance can be combined simultaneously with anti-fogging properties.

Having described the invention, that which is claimed is:

1. An ultraviolet curable hardcoat composition comprising:

(A) finely divided silica:

(B) a multi-functional compound containing two or more terminal acrylic moieties and one or more divalent oxyalkylene radicals having the formula:

$$-((CX_2)_nO)_x((CX_2)_mO)_y-$$

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals; and (C) an olefinically functionalized trialkoxy silane.

2. The composition of claim 1 wherein the multi-functional olefin contains one divalent oxyalkylene radical.

3. The composition of claim 2 wherein X is hydrogen or methyl.

4. The composition of claim 3 wherein X is hydrogen.

5. The composition of claim 4 wherein the multi-functional olefin has the formula:

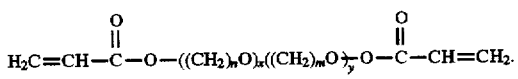

$$H_2C=CH-\overset{O}{\underset{\|}{C}}-O-((CH_2)_nO)_x((CH_2)_mO)_y-O-\overset{O}{\underset{\|}{C}}-CH=CH_2.$$

6. The composition of claim 5 wherein m is 0, y is 0, n is 2 and x is 13.

7. The composition of claim 6 wherein the finely divided silica is aqueous colloidal silica.

8. The composition of claim 7 wherein the olefinically functionalized trialkoxy silane has the formula: $R^4Si(OR^3)_3$, where $R^4$ is a monovalent alkylene radical having from two to forty carbon atoms and $R^3$ is selected from the group of one to forty carbon atom monovalent alkyl hydrocarbon radicals and six to forty carbon atom monovalent aromatic hydrocarbon radicals.

9. The composition of claim 8 wherein the olefinically functionalized trialkoxy silane is methacryloxypropyl trimethoxy silane.

10. The cured composition of claim 1.

11. An ultraviolet curable hardcoat composition comprising the reaction product of:

(A) finely divided silica;

(B) a multi-functional olefin compound containing two or more terminal acrylic moieties and one or more divalent oxyalkylene radicals having the formula:

$$-((CX_2)_nO)_x((CX_2)_mO)_y-$$

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals; and (C) an olefinically functionalized trialkoxy silane; and (D) a hydroxylic solvent.

12. An ultraviolet curable hardcoat composition consisting essentially of:

(A) finely divided silica:

(B) a multi-functional olefin compound containing two or more terminal acrylic moieties and one or more divalent oxyalkylene radicals having the formula:

$$-((CX_2)_nO)_x((CX_2)_mO)_y-$$

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals; and (C) an olefinically functionalized trialkoxy silane.

13. A method for making an ultraviolet curable hardcoat composition comprising:

(a) reacting
  (i) an olefinically functionalized trialkoxy silane with
  (ii) a finely divided silica in the presence of
  (iii) a hydroxylic solvent to produce a reaction product and (b) mixing the reaction product with a multi-functional olefin compound containing two or more terminal acrylic moieties and one or more divalent oxyalkylene radicals having the formula:

$$-((CX_2)_nO)_x((CX_2)_mO)_y-$$

where the sum of the x stoichiometric subscripts for each divalent oxyalkylene radical and the sum of the y stoichiometric subscripts for each divalent oxyalkylene radical when said sums are added together is ten or greater and the stoichiometric subscripts n and m are different and have values independently ranging from one to ten, where each X is independently selected from the group consisting of hydrogen, one to forty carbon atom monovalent hydrocarbon radicals and six to forty carbon atom monovalent aromatic hydrocarbon radicals.

14. The composition of claim 1 wherein the multi-functional olefin compound contains more than one divalent oxyalkylene radical.

15. The composition of claim 14 wherein the multi-functional olefin compound has the formula:

$$CH_3CH_2C(-CH_2-(O-CH_2CH_2)_x-O-\overset{\overset{O}{\|}}{C}-CH=CH_2)_3,$$

where x averages 5.

16. The cured composition of claim 15.

* * * * *